United States Patent
Mavroidis

(10) Patent No.: US 9,781,039 B2
(45) Date of Patent: Oct. 3, 2017

(54) TIMES-SLICED DESIGN SEGMENTATION

(71) Applicant: Applied Micro Circuits Corporation, Sunnyvale, CA (US)

(72) Inventor: Dimitri Mavroidis, Chania (GR)

(73) Assignee: MACOM Connectivity Solutions, LLC, Lowell, MA (US)

(*) Notice: Subject to any disclaimer, the term of this patent is extended or adjusted under 35 U.S.C. 154(b) by 366 days.

(21) Appl. No.: 14/099,554

(22) Filed: Dec. 6, 2013

(65) Prior Publication Data
US 2015/0163024 A1 Jun. 11, 2015

(51) Int. Cl.
*H04L 12/54* (2013.01)
*H04L 12/801* (2013.01)

(52) U.S. Cl.
CPC ..................... *H04L 47/10* (2013.01)

(58) Field of Classification Search
CPC ..................................... H04L 5/0001
USPC ................................... 370/412–429
See application file for complete search history.

(56) References Cited

U.S. PATENT DOCUMENTS

| 5,809,147 A | * | 9/1998 | De Lange | H04L 9/065 380/259 |
| 2007/0036022 A1 | * | 2/2007 | Song | G06F 5/14 365/233.11 |
| 2009/0180494 A1 | * | 7/2009 | Ren | H04L 49/901 370/476 |
| 2010/0054386 A1 | * | 3/2010 | Abel | H04J 3/0685 375/376 |

\* cited by examiner

*Primary Examiner* — Ricky Ngo
*Assistant Examiner* — Wei-Po Kao

(57) ABSTRACT

Systems and methods for multi-channel signal processing by a series of single processing core logic circuitries in time-slicing. A first logic circuitry is configured to process multiple data streams from multiple channels in a first cycle-based time-sliced schedule. A time slice in the first cycle-based time-sliced schedule comprises a predetermined number of clock cycles allocated to a corresponding data stream. A second logic circuitry is coupled to the first logic circuitry and configured to process the data streams in a first fragment-based time-sliced schedule. A time slice in the first fragment-based time-sliced schedule is determined based on a predetermined boundary associated with the data fragment and is allocated to process a data fragment of the data streams.

31 Claims, 10 Drawing Sheets

TIMES-SLICED DESIGN SEGMENTATION

CROSS REFERENCES

The present disclosure is related to: the issued U.S. patent application titled "METHOD FOR CONVERTING A SINGLE CHANNEL HARDWARE MODULE INTO A MULTI-CHANNEL MODULE," U.S. Pat. No. 8,607,181, issued on Dec. 10, 2013; the commonly assigned co-pending U.S. patent application titled "MULTIPLE DATASTREAMS PROCESSING BY FRAGMENT-BASED TIMESLICING." filed on Nov. 26, 2013, application Ser. No. 14/090,610. The foregoing patent and patent application are incorporated by reference herein.

TECHNICAL FIELD

The present disclosure relates generally to the field of signal processing, and, more specifically, to the field of multi-channel signal processing.

BACKGROUND

A single-channel design refers to a synchronous digital design that processes a continuous stream of data from the same channel. For example, the design may receive a word of data in each clock cycle, with the exception of "disabled" cycles which are cycles in which the design receives no data. Architect circuits that process independent data streams from multiple channels typically use a single, common register transfer level (RTL) core design with modifications from a corresponding single-channel design.

A time-sliced logic circuitry design is often used to process data from multiple channels, where a subset of the processing cycles is assigned to each channel. Internally a common design core is shared by all channels, which keeps switching state every time a new channel's data comes in, which can happen as often as once per clock cycle for example.

A conventional time-sliced logic circuitry design is usually cycle-based, which statically allocates a specific, repeated subset of an N-cycle period to each channel. For example, the logic circuitry may be capable of switching from channel X to channel Y at each clock cycle; sometimes X will be the same as Y.

For example, a cycle-based time-sliced logic circuitry that receives data for channel X at cycle C at its input, can produce data for channel X at its output at cycle (C+M), where M is a constant and for the rest of this description, e.g., M=1. The produced data will be a processed version of the data that was received for channel X at cycle (C−L), where L is the latency of the original single-channel design. In that sense, the cycle-based time-sliced design can preserve the latency of the single-channel design.

For example assume a 3-channel time-sliced design whose channels are allocated with bandwidths equal to 48%, 24%, 22% of the total bandwidth respectively, with 6% of the maximum potential bandwidth remaining unused. Out of every N=4 clock, this logic circuitry can allocate 2 cycles to the 1st channel and 1 cycle to each of the other two channels. In a total of 100(=25×4) cycle periods, channel #1 gets a total of two disabled cycles, channel #2 gets one disabled cycle and channel #3 gets three disabled cycles. The disabled cycles can appear anywhere in the 100-cycle period. In order to switch from channel X to channel Y, the logic circuitry needs to save the current value of each register (its "state") for channel X in some internal memory, and load the last saved state of channel Y. In other words, the logic circuitry needs to perform a context switch to switch channel. The state includes the values of all registers in the logic circuitry, and has to be maintained in some form of internal memory, which can potentially become quite large. Unfortunately, this implies that the logic circuitry needs to include enough memory to simultaneously hold the states of all channels that it processes. The demand for a large memory often makes it counter-productive to timeslice a design, especially if the number of channels is low, e.g., less than 4. In that case, it would be often more area efficient to simply replicate the design N times, once for each channel.

SUMMARY OF THE INVENTION

The present disclosure provides a timeslicing mechanism for multi-channel signal processing by use of single processing core logic circuitry with reduced or eliminated need for saving and reloading the states during context switching. Accordingly, embodiments of the present disclosure employ a packet-based timeslicing approach to process data from multiple channels by use of single-processing core logic circuitry. The processing core logic circuitry is configured to processes an entire fragment of data, or a data unit, e.g., a packet or a frame, before context switching to the next channel. Each data fragment may comprise a plurality of words and a fragment boundary. Processing a data fragment at the processing logic circuitry is relatively autonomous and mostly independent of processing other data fragments. Thus, the core logic circuitry only needs to save a reduced number of states to be utilized to process the subsequent fragments. It does not need to save the states, e.g., the values of any registers that are used during the processing of the fragment but whose values are not used for the next fragment. Therefore, the gate area and the memory consumption, and the design complexity of the processing core logic circuitry can be advantageously reduced to a significant degree.

The present disclosure also provides a mechanism to integrate packet-based time-sliced circuitry with cycle-based time-sliced circuitry while each type of circuitry can operate correctly in respective time-sliced schedule and independently for multi-channel data processing. Embodiments of the present disclosure exploit a time-sliced design segmentation architecture in which data streams of multiple channels can be adapted from packet-based time-sliced segment to cycle-based time-sliced segment, or vice versa, by virtue of buffering and/or latency adjustment. The logic circuitry segments of the two types may be designed as a consecutive segment pipeline, wherein each segment feeds data to the immediate succeeding segment and receives data from the immediate preceding segment. A channelized state reset can be performed by resetting one reset component at a time. The reset component can be cycle-based time-sliced segment or a buffer component. A respective reset component can be automatically reset with respect to a specific channel upon receiving a reset indication from an immediate upstream component, and produce a reset indication to be used by a downstream reset component for resetting and producing another reset indication. In this manner, each reset component in the segment pipeline is not reset until valid data is safely flushed the upstream packet-based segments to avoid errors.

In one embodiment of the present disclosure, a circuit configured to process data streams transmitted from multiple communication channels by virtue of timeslicing comprises: A first logic circuitry is configured to process multiple data streams from multiple channels in a first cycle-based time-sliced schedule. A time slice in the first cycle-based time-sliced schedule comprises a predetermined number of clock cycles allocated to a corresponding data stream. A second logic circuitry is coupled to the first logic circuitry in series and configured to process the data streams in a first fragment-based time-sliced schedule. A time slice in the first fragment-based time-sliced schedule is determined based on a predetermined boundary associated with the data fragment and is allocated to process a data fragment of the data streams.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
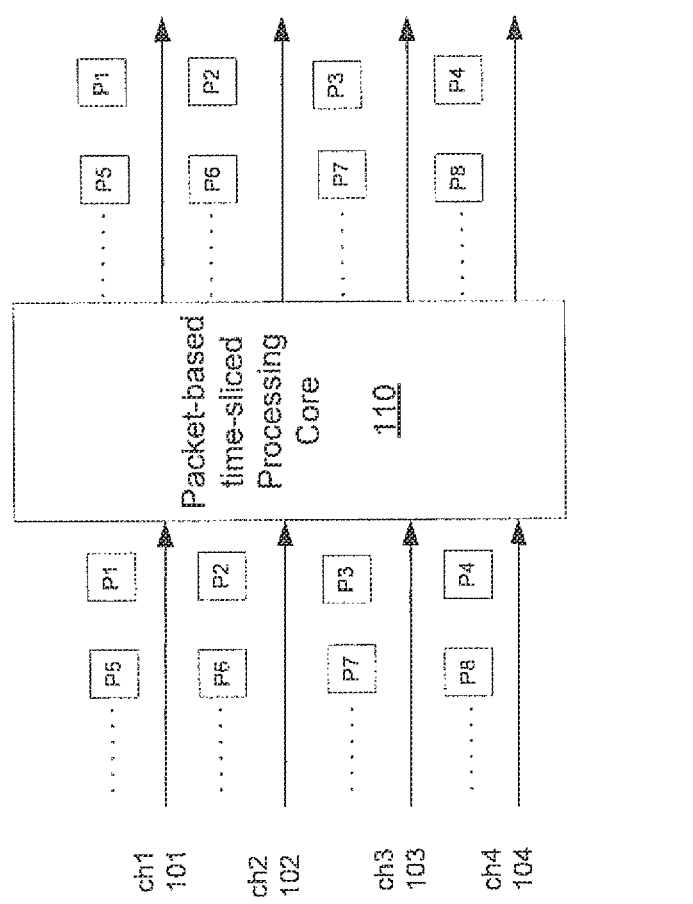
FIG. 1 is a diagram illustrating an exemplary packet-based time-slicing process used in multi-channel data processing by a single processing core in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Times-Sliced Design Segmentation

FIG. 1 is a diagram illustrating an exemplary packet-based time-slicing process used in multi-channel data processing by a single processing core in accordance with an embodiment of the present disclosure. As illustrated, four data streams, 101-104, from respective four channels, ch1, ch2, ch3, and ch3, are provided to an input of the common processing core 110 in sequence. The packets in the streams may be provided in sequence, one after another, to the single-channel processing core 110, and processed in sequence by this core. In some embodiments, the data streams are independent of each other. Each data stream includes a sequence of data fragments, or data units, e.g., packets. According to the present disclosure, during a time slice, the processing core 110 operates to continuously process an entire full data packet without any context switch in an assigned time slice. Because a particular packet can be processed fully in a continuous time slice, the processing core 110 need not maintain the values of the registers, e.g., the state of a channel, that are only related to the particular packet while immaterial to processing subsequent packets of the same, or a different, channel. Thus only one copy of these states needs to exist in the processing core. Rather, the processing logic circuitry only needs to preserve the states to be utilized to process the subsequent packets. This can advantageously reduce memory consumption to a significant extent because all or a substantial portion of the registers of a processing core does not need to be saved during a context switch.

At a predefined boundary of a packet, the processing core 110 can then switch to process the next incoming packet in accordance with a predetermined order. As will be appreciated by those skilled in the art, the present disclosure is not limited to any specific processing order with respect to the channels. In some embodiments, the processing core can process packets from the four streams in a round-robin manner, or based on the priorities of the channels, or in a random order. In some other embodiments, the processing core may process more than one packets of the same channel in consecutive time slices. Further, in some embodiments, although the processing core conceptually processes one packet at a time, in implementation the data packets of multiple channels may be received and processed in a pipelined manner, which is well known in the art. In some embodiments, receiving and processing with respect to a packet may be performed in sequence.

In some embodiments, the processing core need not save any state at all between the processing of consecutive packets, where the processing core can be treated similarly as a single-channel design. As such, the processing core logic circuitry processes one packet at a time in a pipelined manner just like it did in single-channel mode, completely ignoring the fact that each packet may belong to a different channel. This can advantageously and greatly reduce the complexity of the time-sliced design.

Although embodiments described in the present disclosure frequently refer to a packet as a data fragment that can be processed in a particular time slice, as will be appreciated by those skilled in the art, the present disclosure is not limited to any specific definition of a data fragment and the fragment boundary. In some embodiments, the data fragment boundaries may be contained in the fragment as a special sequence of bits, bytes, or a word, e.g., a header. In some other embodiments, a boundary may be identified based on the predetermined lengths of data. In some embodiments, the data fragments processed by a single processing core may comprise varying lengths. In some other embodiments, the data fragments are of equal lengths and accordingly each time slice can span the same duration.

For example, a packet-based time-sliced processing logic circuitry in accordance with the present disclosure can be applied to calculate a Forward Error Correction (FEC) parity for a sequence of Optical Transport Network (OTN) frames in a pipelined manner. It can be assumed that the FEC parity of an OTN frame is a function of the data of this frame only and not of any data in prior or subsequent frames. The processing core can receive at its input an entire OTN frame of channel X, followed by an entire OTN frame of channel Y, and be oblivious to the fact that these frames belong to different channels. The FEC parity of each frame can be calculated using a single copy of any number of internal registers, without the need to save or load any state. This is because each frame is autonomous in the sense that its parity calculation does not depend in any way on the contents of prior frames. In this example, a data fragment corresponds to one OTN frame.

Figure 2:
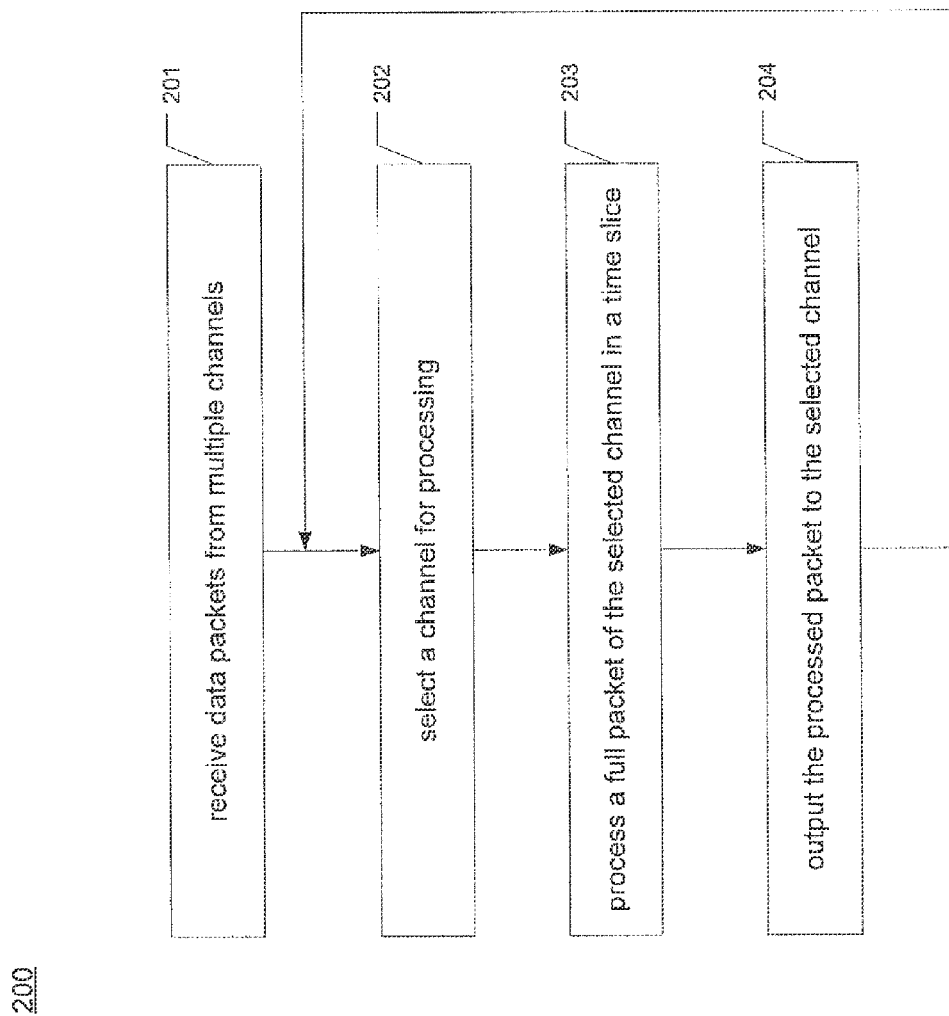
FIG. 2 is a flow chart illustrating an exemplary method of processing multi-channel data using single processing core logic circuitry by virtue of packet-based timeslicing in according with an embodiment of the present disclosure.

FIG. 2 is a flow chart illustrating an exemplary method of processing multi-channel data using a single processing core logic circuitry by virtue of packet-based timeslicing in according with an embodiment of the present disclosure. At 201, data packets from multiple channels are received at the processing core logic circuitry. The multiple channels may be related to or independent of each other. In each time slice, the processing core selects a channel for processing at 202, such as based on a Round-robin scheduling. At 203, a full packet of the selected channel is processed in the time slice without context switch. At 204, the processed packet is output to the downstream of the channel.

In some applications, a single-channel design can be converted to a cycle-based time-sliced one that internally incorporates a packet-based time-sliced core. Buffers can be used to adapt the data streams from a cycle-based time-slicing to a packet-based time slicing and vice versa. One such buffer will be added for each channel that needs to be processed. Each buffer may contain a single FIFO for example.

Figure 3:
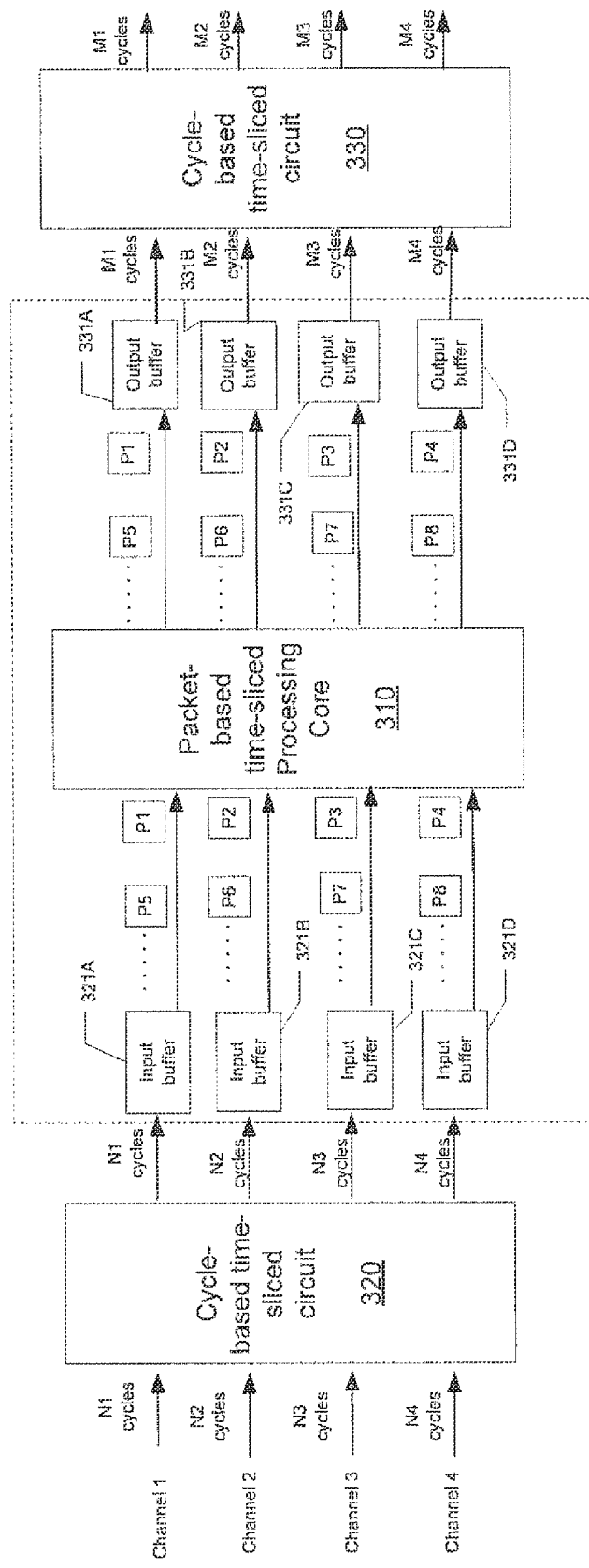
FIG. 3 is a diagram illustrating exemplary data processing circuitry comprising a packet-based time-sliced processing core interfaced with two cycle-based time-sliced logic circuitry circuits.

FIG. 3 is a diagram illustrating exemplary data processing circuitry comprising of a packet-based time-sliced processing core 310 interfaced with two cycle-based time sliced cores 320 and 330. Input buffers 321A-321D are coupled between the upstream cycle-based time-sliced logic circuitry 320 and the packet-based time-sliced logic circuitry 310. Output buffers 331A-331D are coupled between the downstream cycle-based time-sliced logic circuitry 330 and the packet-based time-sliced logic circuitry 310.

At the input of the cycle-based time-sliced logic circuitry 320, each channel at the top-level input/output ports is statically allocated a constant number of cycles out of each period of N total cycles, depending on its bandwidth or data transmission speed. In this example, it can be assumed that each of the four channels is allocated one cycle for each four cycle repeated period, e.g., N1=N2=N3=N4=1. As will be appreciated by those skilled in the art, extending the techniques described here to scenarios where a channel is allocated more than one cycle is within the scope of one of ordinary skill in the art.

In this example, it is assumed that the time-sliced design receives one data word at each clock cycle, along with a channel ID which associates this data word with a particular channel, and an 'enable' signal which marks the word as valid or invalid, e.g., 'enabled' or 'disabled' word. At the output of the cycle-based time-sliced logic circuitry 320, it produces again one data word per clock cycle, associated with a channel ID and an output enable signal. Fine tuning of the bandwidth of each channel is done through the 'enable' signal.

The packet-based time-sliced logic circuitry 310 can then read data from the input buffers in accordance with the packet-based time-sliced schedule and thus read one packet at a time. In some embodiment, if there is less than a full packet available for the logic circuitry 310 to read, the buffer may need to produce a null packet, or a bubble packet, to maintain the correct bandwidth allocation between the channels. The packet-based time-sliced logic circuitry 310 generates processed data packets, e.g., P1, P2, . . . , that are then buffered at the output buffers 331A-331D. The downstream cycle-based time-sliced logic circuitry can read data from the output buffers 331A-331D in accordance with a cycle-based time-sliced schedule. For example, M1, M2, M3 and M4 cycles are allocated to the four channels respectively. In some embodiments, the N1 is equal to M1, and N2 is equal to M2, etc.

Typically, there can be a one-to-one association with each input data word to each output data word; the number of enabled output words for each channel matches the number of enabled input data words for each channel. In other words the output data words will be a processed version of the input data words.

In some embodiments, each buffer contains a single FIFO. Each time valid data is received for channel X, this data can be written to the FIFO of buffer X. Only valid data can be written to each buffer. If disabled cycles are received, the corresponding data will not be written to any buffer. This means that disabled cycles are terminated at the input packet buffers.

Assuming that the number of cycles allocated to each channel is the same, one full packet will be read from each buffer FIFO, before going to the next buffer in a round-robin order. If there is not enough data in a buffer in order to read one full packet from it, the design will instead produce a 'bubble' packet for that channel, as will be described in greater detail below. During the time that the bubble packet is produced, the buffers will not be read.

Assuming that a different number of cycles is allocated to each channel out of each N cycle period, then a number of packets proportional to the number of cycles allocated to channel X will be read from the FIFO of channel X before going to the next buffer in round robin order. If at any point in time a packet needs to be read from a certain buffer but there isn't enough data in the buffer to read a full packet without causing FIFO underflow, a bubble packet will be produced instead as described below.

In some embodiments, the read and write processes are completely independent of each other, which may simplify the circuit design. The actual bandwidth of each channel, including the disabled cycles, may be transparent to a circuit design process according to the present disclosure. Only the static, total number of cycles allocated to that channel, enabled or not, over the N-cycle period is used for design purposes. Further, in some embodiments, the buffers only store valid data for each channel, which can effectively reduce their required capacity.

Increasing or decreasing the percentage of disabled cycles in one channel may not affect the other channels. It only affects the percentage of bubble packets that will be generated for that particular channel. The percentage of bubble packets may be equal to the percentage of disabled cycles.

The output packet buffers at the output of the packet-based core can adapt the packet-based round-robin output data to cycle-based round-robin time-sliced data. The use of output buffers depends on the specifications of the top-level block, and whether they are needed to produce cycle-based round-robin time-sliced data at its output. The output buffers can work similarly with the input buffers; again only valid data is stored, and data is read at the output proportionally to the number of cycles allocated to each channel.

The output controller can statically allocate the pre-specified number of cycles to each channel. Each cycle is allocated to the corresponding channel independently of data availability. Depending on the availability of data, an enabled or disabled output cycle will be produced for that channel. If the downstream cycle-based time-sliced logic circuitry attempts to read a data word from an output buffer and a word is not available, the logic circuitry will produce a single disabled cycle at the output and then go to the next channel.

Figure 4:
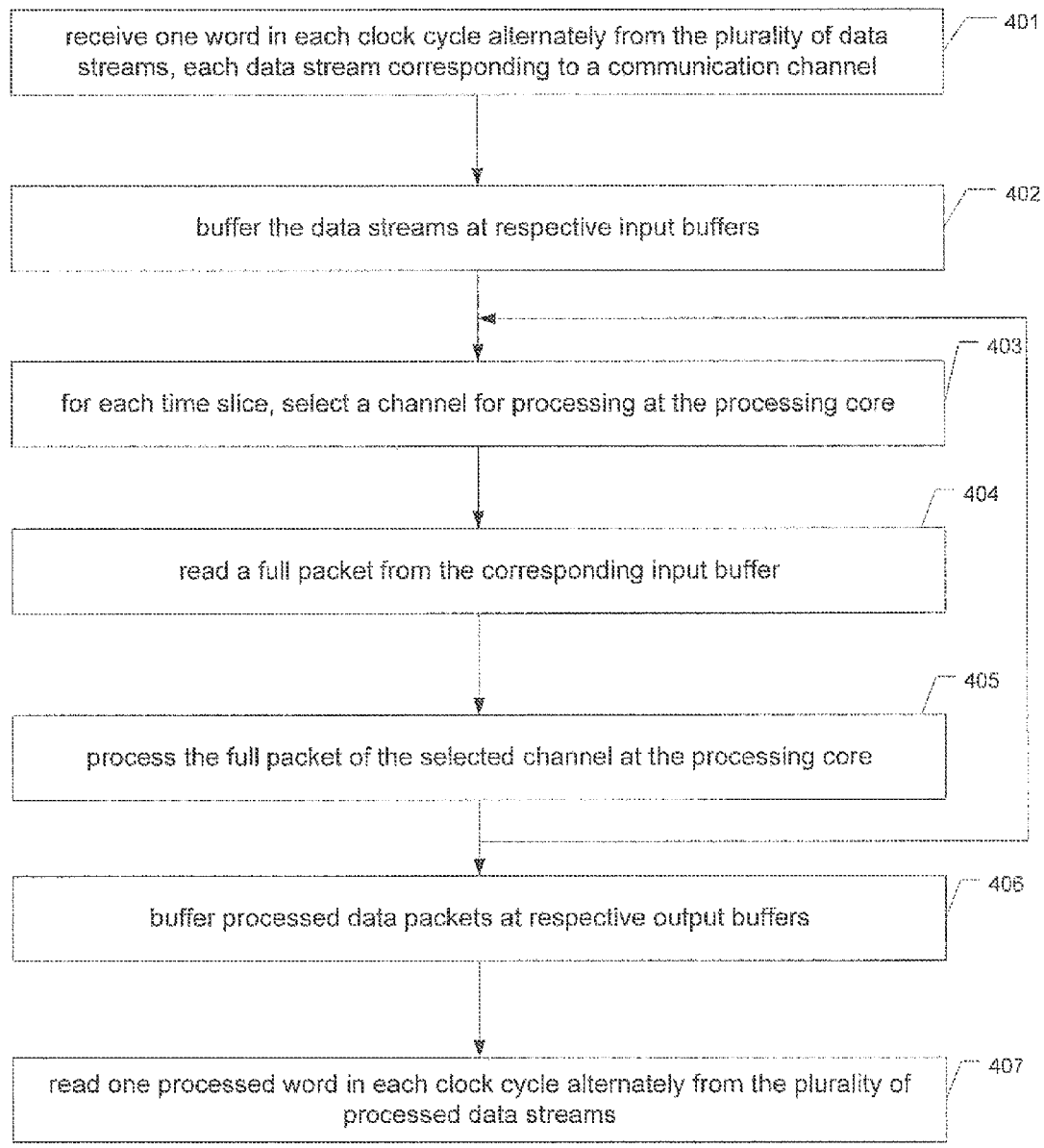
FIG. 4 is a flow chart illustrates an exemplary method of interfacing a cycle-based time-sliced logic circuitry with a packet-based time-sliced logic circuitry by virtue of data buffering.

FIG. 4 is a flow chart which illustrates an exemplary method 400 of interfacing a cycle-based time-sliced logic circuitry with a packet-based time-sliced logic circuitry by virtue of data buffering. At 401, the respective data streams from multiple channels are received, with one word received in each clock cycle from the multiple streams. The data streams are buffered at the input buffers at 402.

For each time slice, at 403, a channel is selected for processing at the packet-based time-sliced processing core. A full packet is read from the corresponding input buffer at 404, and processed at the processing core at 405. Steps 403-405 can be repeated for each time slice.

At 406, the processed data packets are buffered at the output buffers at 406. At 407, in each clock cycle, one processed word is read from the plurality of processed data streams.

In some applications, all channels are allocated with the same bandwidth. For example, each channel of the N channels can be allocated exactly one cycle in an N cycle period. If all input data is enabled (the 'enable' input is always 1), which means that at every clock cycle, one enabled word is received from the channel that owns this cycle, then it can safely be expected that as soon as channel X contains one full packet in its input packet buffer, all channels will also contain one full packet in their corresponding buffers.

However, in some applications, the channels are allocated with different bandwidth if some cycles contain disabled data at the input (enable=0), which means that the effective bandwidth of each channel will be different. In this case, once the processing logic circuitry moves from channel X to channel Y, it may not find one full packet in buffer Y, and will underflow the buffer if it attempts to read one full packet from it.

Bubble packets or null packets can be used to address the underflow problem. When the processing moves on to the next channel in the round-robin order, and finds that there is not enough data to send a full packet to the packet-based processing engine, it will instead send one full packet of "bubble" data—for example a packet filled with 00's. The circuit that reads the input packet buffers can stay on each buffer for P cycles, where P is the number of cycles needed to transmit one full packet, regardless if a packet is available in that buffer or not. During those P cycles, the reading circuit will either read one full packet from the buffer, or it will produce one full bubble packet without reading the buffer at all. In some embodiments, the decision as to whether a bubble packet will be produced will be made based on the FIFO level of that buffer at the start of the P cycle period.

With this approach a buffer can advantageously reduce or avoid underflow. The overflow condition can also easily be reduced or avoided by choosing an appropriate size for the buffer; for example this size is about equal to two packets. As a result, the effective bandwidth for each channel can be preserved. This approach allows incoming disabled cycles to be converted to bubble packet without the need to do any bandwidth calculations or counting of disabled cycles.

This approach can be extended in a case that there are channels which are not allocated one cycle each. For example, take a three channel data processing circuit, and out of a period of N=4 cycles total, 2 cycles are allocated to the 1st channel and 1 cycle allocated to each of the other 2 channels. Assume that a full packet is transmitted in P=100 cycles for a single channel. In that case 3 input packet buffers can be used, one for each of the 3 channels. For each channel X=0 . . . 2, the circuit writes all valid data for channel X to buffer X. It will also read 2 packets from buffer 0, then 1 packet from buffer 1 and then 1 packet from buffer 2, and then will go back to read 2 packets from buffer 0 and so on. If at some point the circuit tries for example to read two packets from buffer 0 and there is only one packet available, the circuit will read that one packet and it will then stop reading buffer 0. For the next P=100 cycles, a bubble packet can be generated for channel 0, not reading any buffer during that time. So the circuit can consume a total of 2*P=200 cycles producing data for channel 0, regardless if this data is read from buffer 0 or is "filled in" with bubble cycles. This way, channels 1 and 2 can be allocated with 100 cycles each in every 400 cycles total, regardless of the number of bubble packets that is produced for channel 0.

A "bubble flag" can be associated with each data word. This flag will travel along with each data word and if set to 1, it will signify that word as belonging to a "bubble packet". All data belonging to "bubble packets" can be dropped at the output of the packet-based time-sliced core, and will not be written to the output packet buffers mentioned earlier as it is not valid data. The processing core can identify the bubble packets using the bubble flag attached to each bubble data word.

Figure 5:
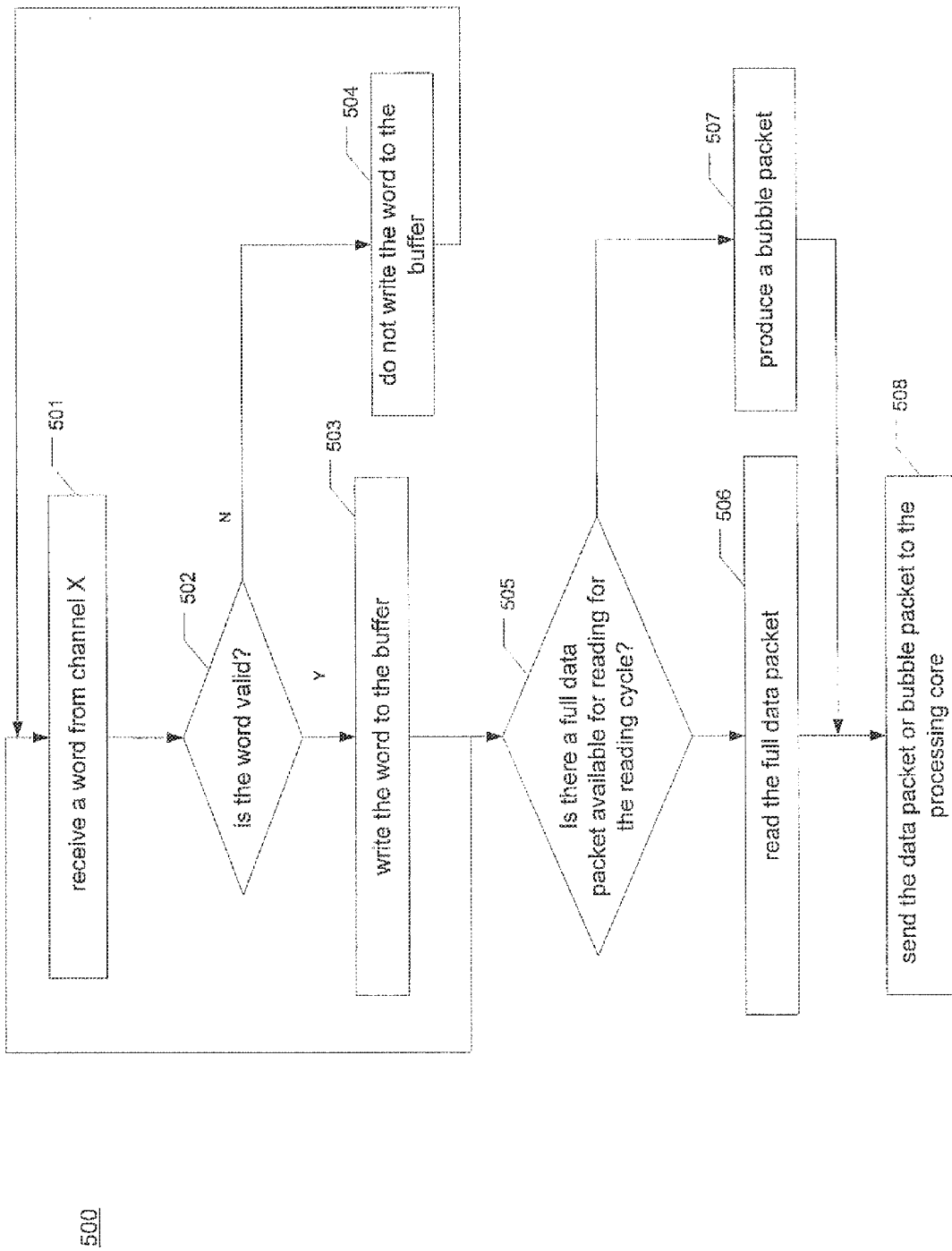
FIG. 5 is a flow chart illustrating an exemplary process of buffering data at an input buffer interfacing a cycle-based time-sliced logic circuitry and a packet-based time-sliced logic circuitry in accordance with an embodiment of the present disclosure.

FIG. 5 is a flow chart illustrating an exemplary process of buffering data at an input buffer interfacing a cycle-based time-sliced logic circuitry and a packet-based time-sliced logic circuitry in accordance with an embodiment of the present disclosure. At 501, in each clock cycle, a word is received from channel X. If the word is determined to be valid at 502, it is written to the buffer during a writing cycle at 403. If the word is invalid, the word is not written to the buffer and so terminated at 504. The foregoing 501-503 are repeated for each clock cycle at the input of the input buffer.

During a reading cycle, if it is determined at 505 that a full data packet is available for reading and processing by the packet-based time-sliced logic circuitry, the full data packet is read at 506 and sent to the packet-based time-sliced logic circuitry at 508. On the other hand, if a full data packet is unavailable at 505, a bubble packet is produced and a corresponding bubble indication is attached to the packet at 507. The bubble packet is sent to the packet-based time-sliced logic circuitry at 508.

In some embodiments, a circuitry design may include a hybrid of cycle-based and packet-based circuits, for example configured as a time-sliced design segmentation architecture that includes multiple consecutive segments where each segment can process multi-channel data in a respective timeslicing manner independently. In some of such embodiments, the segments may be arranged in a segment pipeline structure, where segment S(X) can only receive data from segment S(X−1) and can only send data to segment S(X+1). In some other embodiments, a segment may receive data from more than one another segment. If the received data are of different channels, channel synchronization can be performed so that, at any given clock cycle, any one segment processes data from one channel only.

In some embodiments of the hybrid time-sliced circuitry, input packet buffers may be added between an upstream cycle-based segment and a downstream packet-based time-sliced segment to convert a cycle-based output of a segment to the packet-based input.

In some embodiments, output packet buffers may be added between an upstream packet-based segment and a downstream cycle-based time-sliced segment to convert a packet-based output of a segment to the cycle-based input. However, cycle-based segments typically may receive data in any channel order and so they are capable of receiving one full packet of a given channel at a time. Thus, in some embodiments, output buffers may not be needed between an upstream packet-based segment and a downstream cycle-based segment since a cycle-based segment may receive one packet at a time from each channel. A single set of output packet buffers may be disposed at the end of the segment pipeline if data are intended to be output in a cycle-based time-sliced manner from the pipeline.

Figure 6:
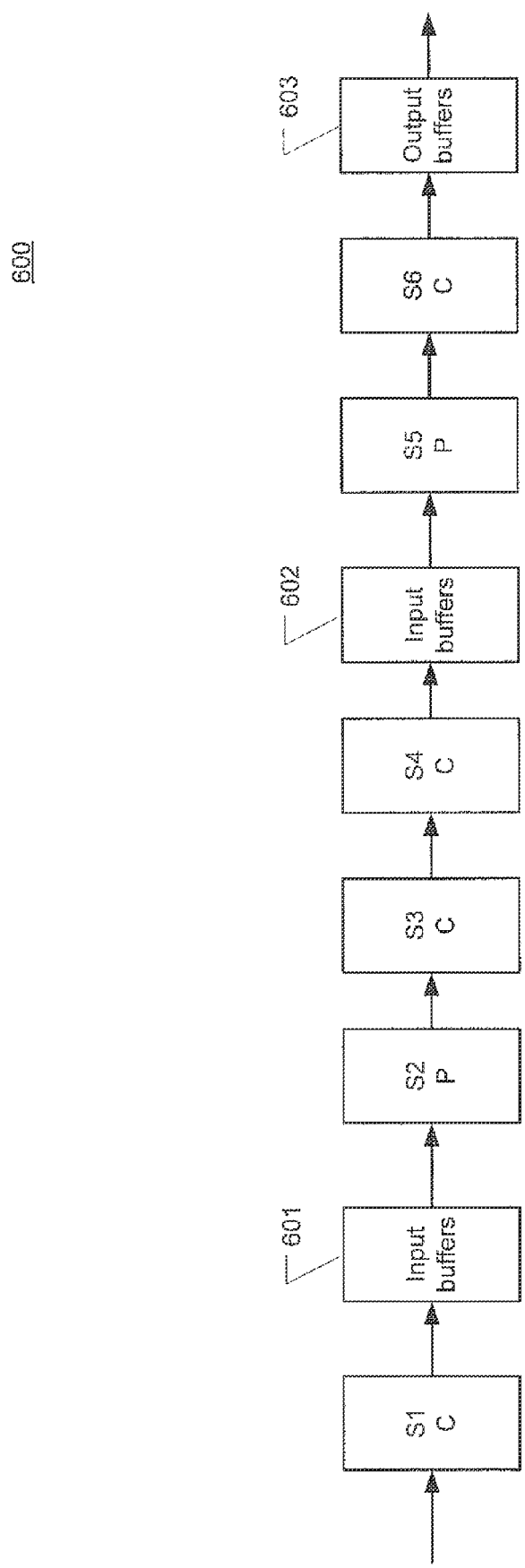
FIG. 6 is a block diagram illustrating a configuration of a segment pipeline that includes a hybrid of packet-based time-sliced segments and cycle-based time-sliced segments, and buffers in accordance with an embodiment of the present disclosure.

FIG. 6 is a block diagram illustrating a configuration of a segment pipeline 600 that includes a hybrid of packet-based time-sliced segments and cycle-based time-sliced segments, and buffers in accordance with an embodiment of the present disclosure. In the illustration, the segments denoted as "C" are the cycle-based and the segments denoted as "P" are packet-based time-sliced segments. In the illustrated embodiment, each packet-based time-sliced segment, i.e., S2 and S5, has a respective set of input buffers, i.e., 601 and 602, at its input. A single set of output buffers 603 is used at the end of the pipeline such that the output buffers 603 can supply data to downstream circuitry in a cycle-based time-sliced manner.

In some embodiments, an input packet buffer may not be needed if the total single-channel latency L of the cycle-based time-sliced segments between two packet based segments, e.g., an upstream segment and a downstream segment, is an integer multiple of the number of cycles P that is needed to transmit one full packet. To achieve this, a proper timesliced delay may be added before the downstream packet based time-sliced design. By reducing the number of input packet buffers, the design area complexity maybe advantageously reduced.

Figure 7:
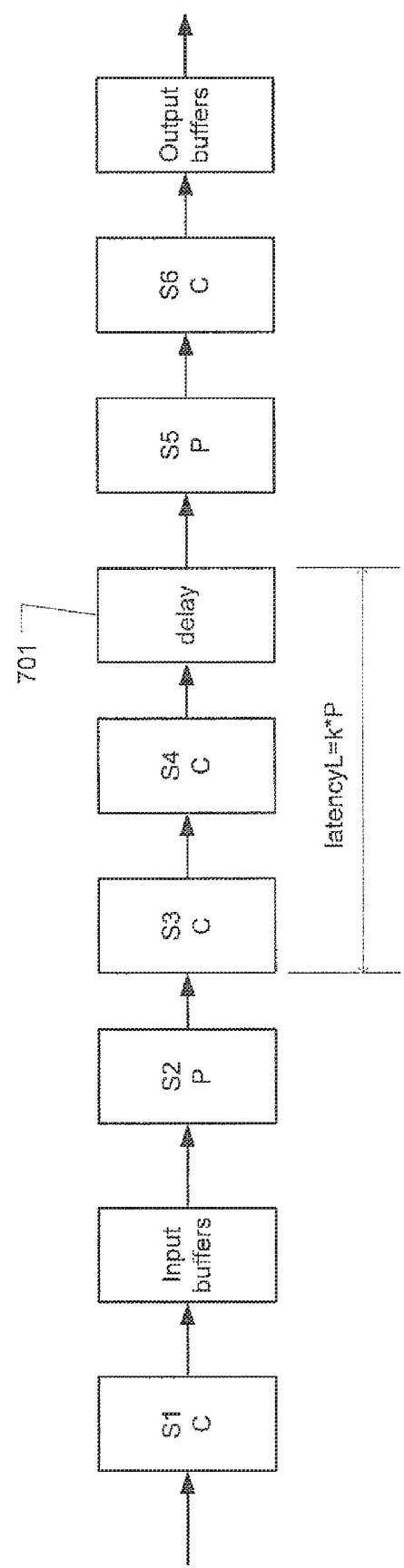
FIG. 7 is a block diagram illustrating a configuration of a segment pipeline utilizing a delay component to adjust the total single-channel latency of the cycle-based time sliced segments between two packet-based segments in accordance with an embodiment of the present disclosure.

FIG. 7 is a block diagram illustrating a configuration of a segment pipeline 700 utilizing a timesliced delay component 701 to adjust the total single-channel latency of the cycle-based time sliced segments between two packet-based segments, S2 and S5, in accordance with an embodiment of the present disclosure. As illustrated, the delay component 701 may add a calculated time delay to the data streams such so that the collective latency of the cycle-based segments S3, S4 and delay is equal to a multiple of P, i.e., L=k×P, where k is an integer. For instance, if a full packet of channel X enters segment S3 at cycles 0 . . . (P−1), then a full packet will exit the timesliced delay segment at cycles 3 . . . (P+2). Accordingly, the packet-based segment S5 can see one packet at a time at its input and thus operate properly.

A channelized state reset, i.e., resetting all states for one channel while keeping the other channels intact, is often needed in most time-sliced logic circuitry designs. In a time-sliced segmented design, different segments may operate on different channels at a given time, so all segments may not be reset at the same cycle. In addition, the packet-based time-sliced segments may not keep separate storage for the states of each channel; instead they may share the same storage for the states of all channels. The shared states may not need to be reset since they are typically dropped after each packet has been processed.

A channelized state reset can be performed by resetting one component at a time which may be a cycle-based time-sliced segment or a buffer. Each component can be automatically reset with respect to a specific channel upon receiving a reset indication from an upstream component, and produce a reset indication to be used by a downstream component to reset and produce a reset indication. In this manner, each component is not reset until valid data is safely flushed from the pipeline inside the upstream packet-based segments to avoid errors.

The present disclosure is not limited to any specific process of generating reset indications. In some embodiments, invalid data may be added to the data streams as reset indication for a succeeding segment or buffer. For example, a word of data in the logic circuitry may be associated with, or carry, two flags: the "valid/invalid" flag and the "bubble/non-bubble" flag. For example, at the top-level input and output ports of the pipeline, for a given channel X, enabled and disabled cycles appear based on the value of the "enable" input/output signal. As soon as the input disabled data reach the first input packet buffer, they are converted to bubble packets through the process described earlier. For the rest of the segment pipeline, only enabled data appear, which may be either normal or bubble data. At the output packet buffers, the bubble data may again be converted to disabled output cycles. Only non-bubble data are categorized as valid/invalid, and all bubble data can be considered valid, for example. Invalid data and bubble data may eventually be dropped in the pipeline.

In some embodiments, packet-based time-sliced segment may not need to reset during a channelized state reset process. Thus the term "reset component" is used herein to refer to the design part which is either a cycle-based time-sliced segment, or a set of input/output packet buffers. Each reset component can produce one or more cycles of data marked as invalid upon resetting. After a period of invalid data, the reset component can switch to producing valid data, and may not produce another cycle of invalid data until it is reset again. For example, all output data may be tagged as invalid until the component frames up, or receives any valid data at its input and so on.

Figure 8:
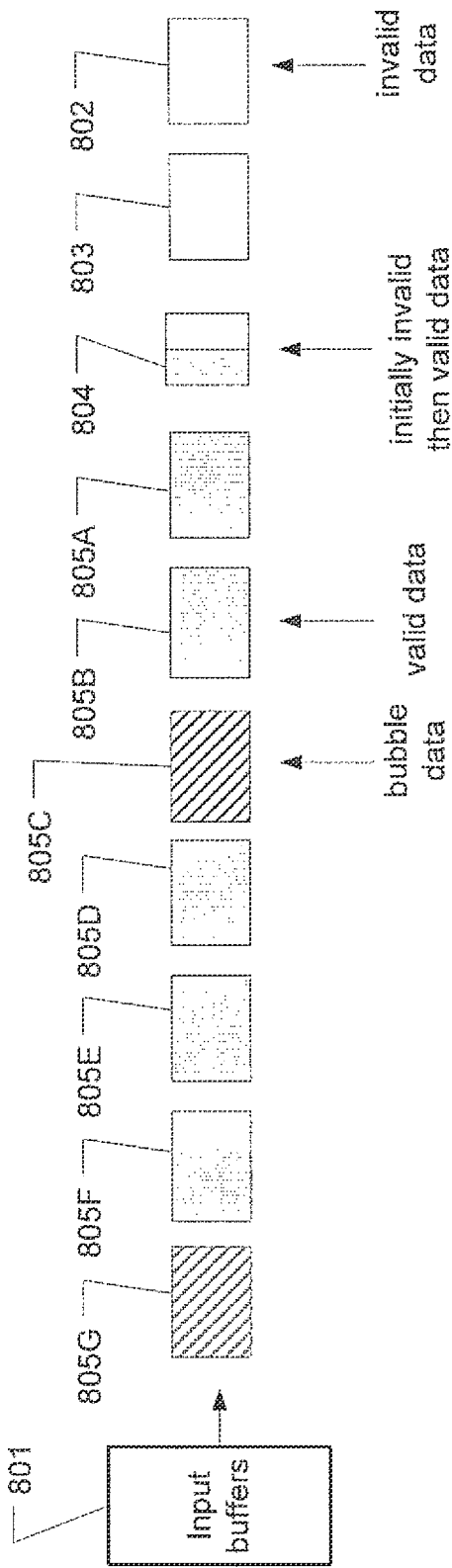
FIG. 8 illustrates the different types of packets supplied out of the input buffers of a channel in accordance with an embodiment of the present disclosure.

When the very first time an input packet buffer starts to send a packet to a packet-based time-sliced segment, it may not have the first word of the packet at the top of its FIFO. In other words, the very first packet in the FIFO may be incomplete. In that case, the input packet buffer will send invalid data for the initial part of the packet that is missing. The input packet buffers can also send invalid data for any given channel when they are reset, until they receive valid data for that channel. FIG. 8 illustrates the different types of packets supplied out of the input buffers 801 of a channel in accordance with an embodiment of the present disclosure. Input buffers of all channels may produce such packets in a round robin fashion as explained earlier. As illustrated, the initial packets that are sent at startup, 802 and 803, contain invalid data, and the packet 804 contains a mixture of invalid data and valid data. Then, only packets with valid data packets 805A-805G are sent from the input buffers 801, including the bubble packets 805C and 805G.

In some embodiments, the very first component of a pipeline is either a cycle-based time-sliced segment, or a set of input packet buffers in front of a packet-based time-sliced segment. In order to reset a segmented time-sliced logic circuitry, an external reset instruction need only be sent to the very first reset component and the downstream reset components can then reset automatically. Each of the following components may be configured to automatically reset itself as soon as it receives a valid word followed by an invalid word.

Figure 9:
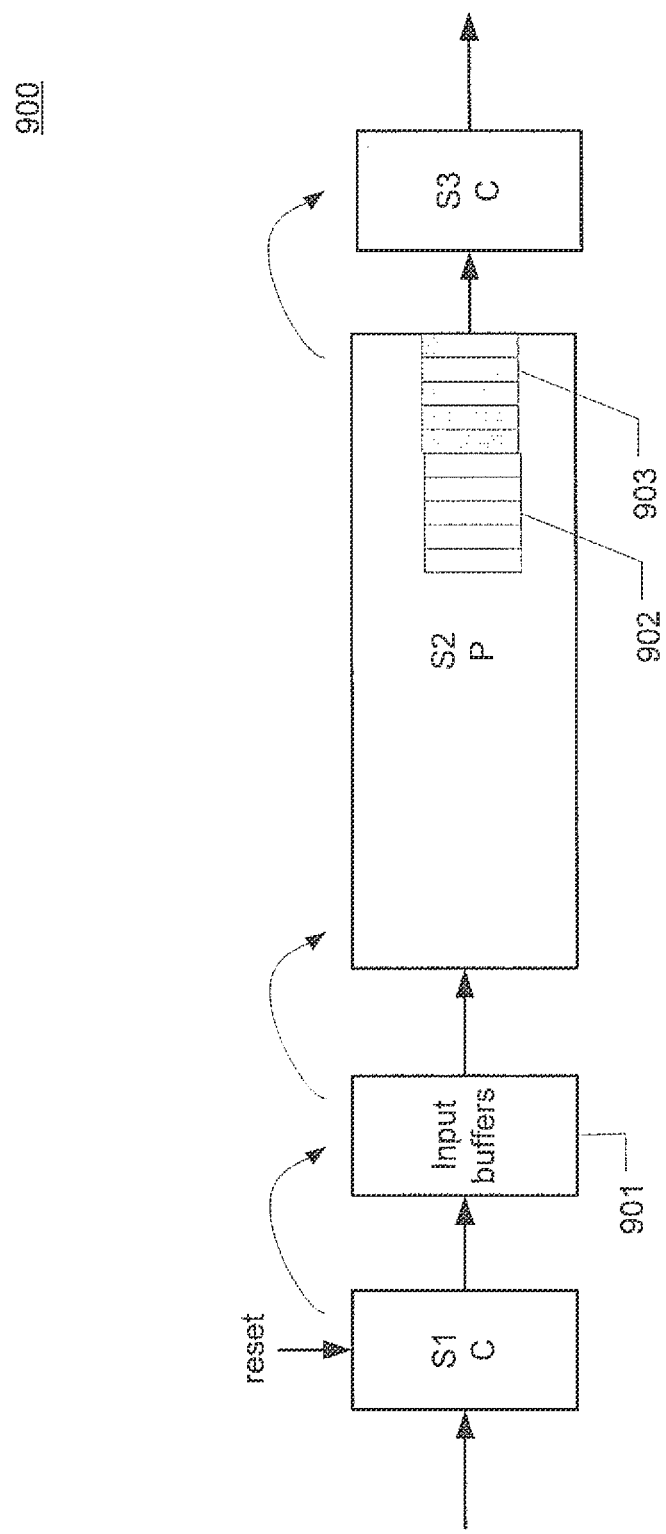
FIG. 9 illustrates the channelized reset process in a segmentation pipeline in accordance with an embodiment of the present disclosure.

FIG. 9 illustrates the channelized reset process in a segmentation pipeline 900 in accordance with an embodiment of the present disclosure. The pipeline 900 includes two cycle-based time-sliced segments S1 and S3, a packet-based time-sliced segments S2, and input buffers 901. As soon as the very first segment S1 is reset, e.g., through external control logic circuitry, it generates a number of invalid data words, as described earlier. The invalid data 902 then flow through the packet-based time-sliced data segment S2 just like the valid data 903. Invalid data words are treated as an integral part of a packet, and carry the invalid=1 flag with them for example. As soon as the invalid data reaches the cycle-based time-sliced segment S3 that had received valid data earlier, this segment S3 will reset itself and then produce invalid data keeping its state intact in order to reset the downstream reset component (not shown). Each reset component may not alter its state again until it receives new valid data at its input.

Thus, the invalid data also serve to flush all the valid data from the pipelines inside the packet-based segments. As soon as a cycle-based segment receives invalid data, it can assume that all valid data in the segment that precede it in the pipeline have now been flushed. Provided this process is followed, the channelized reset can ripple through the segment pipeline, resetting one segment at a time. Each segment may not receive any more valid data from the prior valid stream of channel X after it has been reset.

Figure 10:
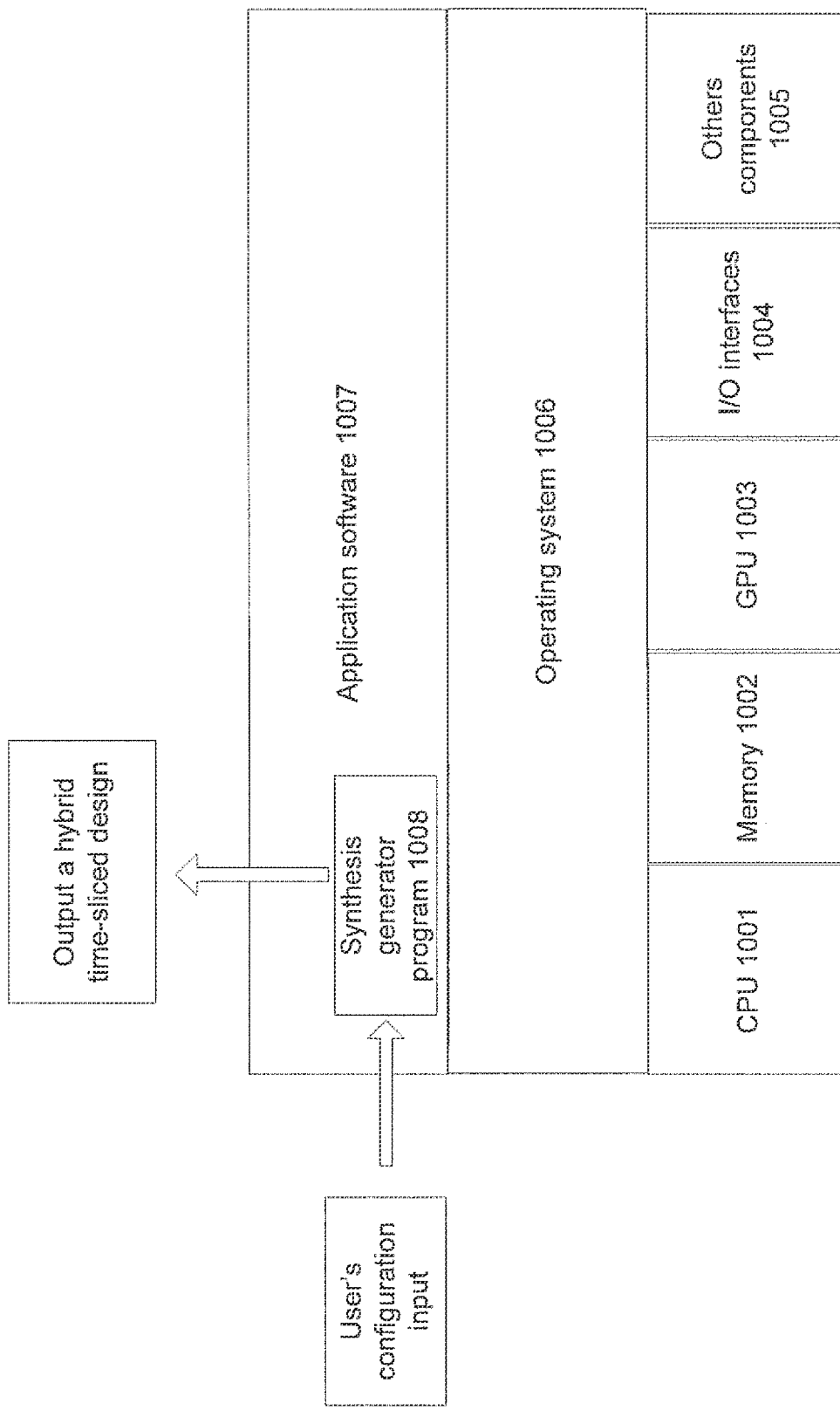
FIG. 10 illustrates a block diagram of a computing system including a synthesizable code generator in accordance with an embodiment of the present disclosure.

The hybrid time-sliced processing logic circuitry as well as associated circuitry disclosed herein can be produced automatically by a synthesizable code generator, such as VHDL, Verilog, or other hardware description languages known to those skilled in the art. FIG. 10 illustrates a block diagram of a computing system including a synthesizable code generator in accordance with an embodiment of the present disclosure. The computing system comprises a processor 1001, a system memory 1002, a GPU 1003, I/O interfaces 1004 and other components 1005, an operating system 1006 and application software 1007 including a synthesis generator program 1008 stored in the memory 1002. When incorporating the user's configuration input and executed by the processor 1001, the generator program 1008 of the hybrid time-sliced processing logic circuitry can produce a synthesizable code representing a time-sliced processing circuit comprising cycle-based and packet-based time-sliced components and the associated buffers and/or delay circuits. The synthesizable code may be combined with other code, either produced by a generator program or authored by a programmer. Synthesizable code may be written in Verilog, VHDL, or other hardware description languages known to those skilled in the art.

The generator program comprises components that are used to produce corresponding components of synthesizable code, such as input buffer code generator, a packet-based time-sliced processing logic circuitry code generator, a cycle-based time-sliced processing logic circuitry code generator, a delay code generator, and an output interface code generator.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. An electronic circuit for processing multiple data streams, the electronic circuit comprising:
 a first logic circuitry configured to process data streams from multiple communication channels in a first cycle-based time-sliced schedule, wherein a time slice in said first cycle-based time-sliced schedule comprises a predetermined number of clock cycles allocated to a corresponding data stream; and a second logic circuitry coupled to said first logic circuitry and configured to process said data streams in a first fragment-based time-sliced schedule, wherein: a time slice in said first fragment-based time-sliced schedule is allocated to process a data fragment of an associated data stream of said data streams; a time slice is determined based on a predetermined boundary associated with said data fragment;

a third logic circuitry coupled to said first logic circuitry, wherein said third logic circuitry is configured to process said data streams in a second fragment-based time-sliced schedule, wherein a duration between a data fragment exiting said third logic circuitry and said data fragment entering said second logic circuitry segment is caused to be equal to an integer multiple of a time slice in said first fragment-based time-sliced schedule.

2. The electronic circuit of claim 1 further comprising an input buffer coupled between said first logic circuitry and said second logic circuitry, wherein said input buffer is configured to:

receive a data stream output from said first logic circuitry in accordance with said first cycle-based time-sliced schedule;

buffer said data stream; and supply said data stream to said second logic circuitry in accordance with said first fragment-based time-sliced schedule.

3. The electronic circuit of claim 2, wherein, in response to a reset indication, said first logic circuitry is configured to reset state stored therein and related to said data stream, and supply a first reset indication; and wherein said input buffer corresponding to said data stream is configured to: receive a first reset indication from said first logic circuitry; reset states stored therein in response to said first reset indication; and generate a second reset indication for resetting a downstream circuit coupled to said input buffer.

4. The electronic circuit of claim 3, wherein each of said first and said second reset indications comprises a sequence of invalid data words following a valid data word.

5. The electronic circuit of claim 1, wherein said second logic circuitry comprises a plurality of cycle-based time-sliced components coupled in series and configured to process said data streams in respective cycle-based time-sliced schedules, and further comprising a delay component coupled between said third logic circuitry and said first logic circuitry, and wherein said delay component is configured to add a channelized time delay to said data streams.

6. The electronic circuit of claim 1, wherein said data fragment is transmitted from said third logic circuitry segment to said second logic circuitry without being buffered.

7. The electronic circuit of claim 1, wherein said second logic circuitry is configured to send said data streams to said first logic circuitry without said data streams being buffered.

8. A system for processing data from multiple communication channels, said system comprising:

an input port configured to receive data streams from said multiple communication channels;

a plurality of logic circuitry components comprising:

a plurality of first type logic circuitry components configured to process said data streams in accordance with cycle-based time-sliced schedules, wherein a time slice in a cycle-based time-sliced schedule comprises a predetermined number of clock cycles allocated to a corresponding data stream; and a plurality of second type logic circuitry components configured to process said data streams in accordance with respective fragment-based time-sliced schedules, wherein a time slice in a fragment-based time-sliced schedule is allocated for a respective component of said plurality of second type logic circuitry components to process a data fragment of an associated data stream, wherein said respective component is configured to store selected state of said associated data stream for switching to a next data stream, and wherein a time slice in said fragment-based time-sliced schedule is determined based on a predetermined boundary associated with a corresponding data fragment, wherein a second type logic circuitry of said plurality of second type logic circuitry component is configured to:

receive a first reset indication; and supply said first reset indication to another logic circuitry component coupled to an output of said second type logic circuitry component without resetting state stored in said second type logic circuitry component; and an output port configured to output said data streams to said multiple communication channels.

9. The system of claim 8, wherein said plurality of logic circuitry components are coupled in series, and wherein a logic circuitry component is configured to: receive said data streams from a preceding logic circuitry component; process said data streams; and supply said data streams to a succeeding logic circuitry component.

10. The system of claim 9, wherein said input port is configured to receive said data streams in accordance with a first cycle-based time-sliced schedule, and wherein said output port is configured to supply said data streams in accordance with a second cycle-based time-sliced schedule.

11. The system of claim 10, wherein said plurality of logic circuitry components further comprise one or more input buffer components, and wherein an input buffer component is configured to:

receive said data streams in accordance with a cycle-based time-sliced schedule;

store said data streams; and supply said data streams in accordance with a fragment-based time-sliced schedule.

12. The system of claim 11, wherein said plurality of logic circuitry components further comprise one or more output buffer components, and wherein a respective output buffer component is configured to:

receive said data streams in accordance with a fragment-based time-sliced schedule;

store said data streams; and supply said data streams to said output port in accordance with said a cycle-based time-sliced schedule.

13. The system of claim 11 further comprising: an input buffer component coupled between said input port and a second type logic circuitry component; and an output buffer component coupled between an output of a second type logic circuitry component and said output port.

14. The system of claim 11, wherein said plurality of logic circuitry components comprise a first component configured to:

receive a channelized reset signal;

reset states that are related to a data stream and stored in said first component; and generate said first reset indication to a second component coupled to an output of said first component; and wherein, if said second component is a first type logic circuitry component, an input buffer component or an output buffer, said second component is configured to:
receive said first reset indication;
reset state that are stored in said second component and related to said data stream; and
generate a second reset indication to a third component coupled to an output of said second component.

15. The system of claim 11, wherein said first reset indication comprise a sequence of invalid words following a valid word.

16. The system of claim 11,
wherein said plurality of second type logic circuitry components comprise an upstream component and a downstream component, wherein each of said upstream component and said downstream component is configured to process a data fragment in a consecutive number of clock cycles;
wherein said plurality of first type logic circuitry components comprise a subset of first type logic circuitry components coupled between said upstream component and said downstream component; and
wherein said plurality of logic circuitry component further comprises a time-sliced delay component coupled between said upstream component and said downstream component, and wherein said time-sliced delay component is configured to add a channelized latency to said data streams such that a duration for said data fragment to transmit through said subset and said delay component is substantially equal to an integer multiple of said consecutive number of clock cycles.

17. The system of claim 11, wherein said second type logic circuitry component is coupled to an input of a first type logic circuitry component, and wherein a data fragment is transmitted from said second type logic circuitry component to said first type logic circuitry component without being buffered.

18. A method of processing data streams transmitted from multiple communication channels, said method comprising:
receiving data streams in a cycle-based time-sliced schedule of said multiple communication channels from a first circuit;
processing said data streams in a fragment-based time-sliced schedule at a processing circuit; and
supplying said data streams in said fragment-based time-sliced schedule to a second circuit,
wherein a time slice in said fragment-based time-sliced schedule is allocated to process a respective data fragment of an associated data stream, and
wherein said time slice is determined based on a predetermined boundary associated with said respective data fragment;
adding a predetermined time delay to said data streams to change from processing said data streams in said cycle-based time-sliced schedule to processing said data streams in said fragment-based time-sliced schedule, wherein said predetermined time delay is determined based on a data fragment size in said data streams and a latency with respect to said data streams between an upstream circuit and said processing circuit, wherein said upper circuit is configured to supply said data streams according to a fragment based time-sliced schedule.

19. The method of claim 18, wherein a time slice in said cycle-based time-sliced schedule comprises a respective predetermined number of clock cycles allocated to a corresponding data stream.

20. The method of claim 19 comprising buffering said data streams to change from processing said data streams in said cycle-based time-sliced schedule to processing said data streams in said fragment-based time-sliced schedule.

21. The method of claim 18, wherein a plurality of cycle-based time-sliced circuits are coupled between said upstream circuit and said second circuit.

22. The method of claim 18 further comprising:
receiving a first reset signal at said processing circuit, wherein said first reset signal indicative of resetting a respective channel;
if said processing circuit is a cycle-based time-sliced component, then resetting states in response to said first reset signal in said processing circuit that are related to said respective channel, generating a second reset indication at said processing circuit, and supplying said second reset indication to said second circuit.

23. The method of claim 22, wherein, if said second circuit is a buffer component, then resetting states in response to said second reset signal that are stored in said second circuit and related to said respective channel, generating a third reset indication at said second circuit, and supplying said third reset indication to a downstream circuit coupled to an output of said second circuit.

24. The method of claim 22, if said processing circuit is a fragment-based time-sliced circuit, then supplying said first reset indication to said second circuit without resetting state stored in said processing circuit.

25. The method of claim 22, wherein each of said first and said second reset indications is a sequence of invalid words following a valid word.

26. A method of performing a channelized reset in a circuitry configured to process data streams from multiple channels, said method comprising:
sending an initial reset signal to said circuitry, wherein:
said circuitry comprises a plurality of cycle-based time-sliced components and a plurality of fragment-based time-sliced components, wherein respective cycle-based time-sliced components and respective fragment-based time-sliced components is are configured to: process a respective data fragment of a respective channel of said multiple channels; and wherein said initial reset signal is indicative of resetting a channel of said multiple channels; and
resetting said plurality of cycle-based time-sliced components successively in response to said initial reset signal, wherein each of said respective cycle-based time-sliced components is reset after data from preceding respective fragment-based time-sliced components are flushed, wherein a respective cycled-based time-sliced component is operable to be rest in response to receiving invalid words.

27. The method of claim 26 comprising: at a respective cycle-based component,
receiving a reset indication generated from an upstream component coupled to an input of said cycle-based component;
resetting said respective cycle-based component with respect to said channel;
generating another reset indication; and
supplying said another reset indication to a downstream component coupled to an output of said cycle-based component.

28. The method of claim 27, wherein said another reset indication comprises a sequence of invalid words following a valid word.

29. The method of claim 28 comprising:
resetting a buffer component of said downstream component with respect to said channel in response to said sequence of invalid words;
generating another sequence of invalid words at said buffer component; and
supplying said another sequence of invalid words from said buffer component to another component coupled to an output of said buffer component.

30. The method of claim 28 comprising:
receiving said invalid words without processing said invalid words at said downstream component, wherein said downstream component comprises a fragment-based time-sliced component; and
supplying said invalid words to another component coupled to an output of said fragment-based time-sliced component.

31. The method of claim 26 comprising:
receiving said data streams from a preceding component at a respective component of said plurality of components;
processing data of said data streams at said respective component; and
supplying said data streams from said respective component to a succeeding logic circuitry component.

* * * * *